(12) United States Patent
Schricker

(10) Patent No.: US 6,272,263 B1
(45) Date of Patent: Aug. 7, 2001

(54) FIBRE OPTIC ROUTING SYSTEM

(76) Inventor: Ulrich Schricker, Am Kreuzacker 13, 91154 Roth (DE)

(*) Notice: Subject to any disclaimer, the term of this patent is extended or adjusted under 35 U.S.C. 154(b) by 0 days.

(21) Appl. No.: 09/133,256

(22) Filed: Aug. 13, 1998

(30) Foreign Application Priority Data

Aug. 14, 1997 (EP) .................................................. 97114023

(51) Int. Cl.$^7$ .................................................. G02B 6/36
(52) U.S. Cl. ........................... 385/14; 385/114; 385/121; 385/49; 385/80
(58) Field of Search ............................... 385/114, 59, 14, 385/63, 49, 80, 131, 132, 121, 81

(56) References Cited

U.S. PATENT DOCUMENTS

| | | | |
|---|---|---|---|
| 3,953,566 | 4/1976 | Gore | 264/127 |
| 3,962,153 | 6/1976 | Gore | 521/79 |
| 4,096,227 | 6/1978 | Gore | 264/110 |
| 4,187,390 | 2/1980 | Gore | 174/120 R |
| 4,678,264 | 7/1987 | Bowen | 385/89 |
| 4,998,796 | 3/1991 | Bonanni et al. | 385/83 |
| 5,204,925 | 4/1993 | Bonanni et al. | 430/379 |
| 5,220,628 | 6/1993 | Delbare et al. | 385/14 |
| 5,292,390 | 3/1994 | Burack et al. | 156/176 |
| 5,299,273 | 3/1994 | Evans | 385/77 |
| 5,582,673 | 12/1996 | Burack et al. | 156/285 |
| 5,611,017 | * 3/1997 | Lee et al. | 385/114 |
| 5,703,973 | * 12/1997 | Metler et al. | 385/14 |
| 6,005,991 | * 12/1999 | Knasel | 385/14 |

* cited by examiner

Primary Examiner—Hung N. Ngo
(74) Attorney, Agent, or Firm—Allan M. Wheatcraft

(57) ABSTRACT

The invention relates to a fibre optic routing board for routing a plurality of fibre optic cables. The fibre optic routing board is provided with one or more optical conductors disposed between a first lower laminate layer and a first upper laminate layer, the one or more optical conductors being connected to at least one of the optical fibres in the plurality of fibre optic cables, wherein at least one of the first lower laminate layer or the first upper laminate layer is so constructed that it attaches at least one of a jacket over a first. Advantageously, the fibre optic routing board additionally comprises a second laminate layer positioned between the first upper or lower laminate layer and the optical conductors. The use of a two layer laminate allows each of the laminate layers to have different properties. Thus one layer might reduce transverse stresses on the connecting element and enclosed optical fibre whilst another layer might reduce longitudinal stresses on the connecting element and enclosed optical fibre.

39 Claims, 4 Drawing Sheets

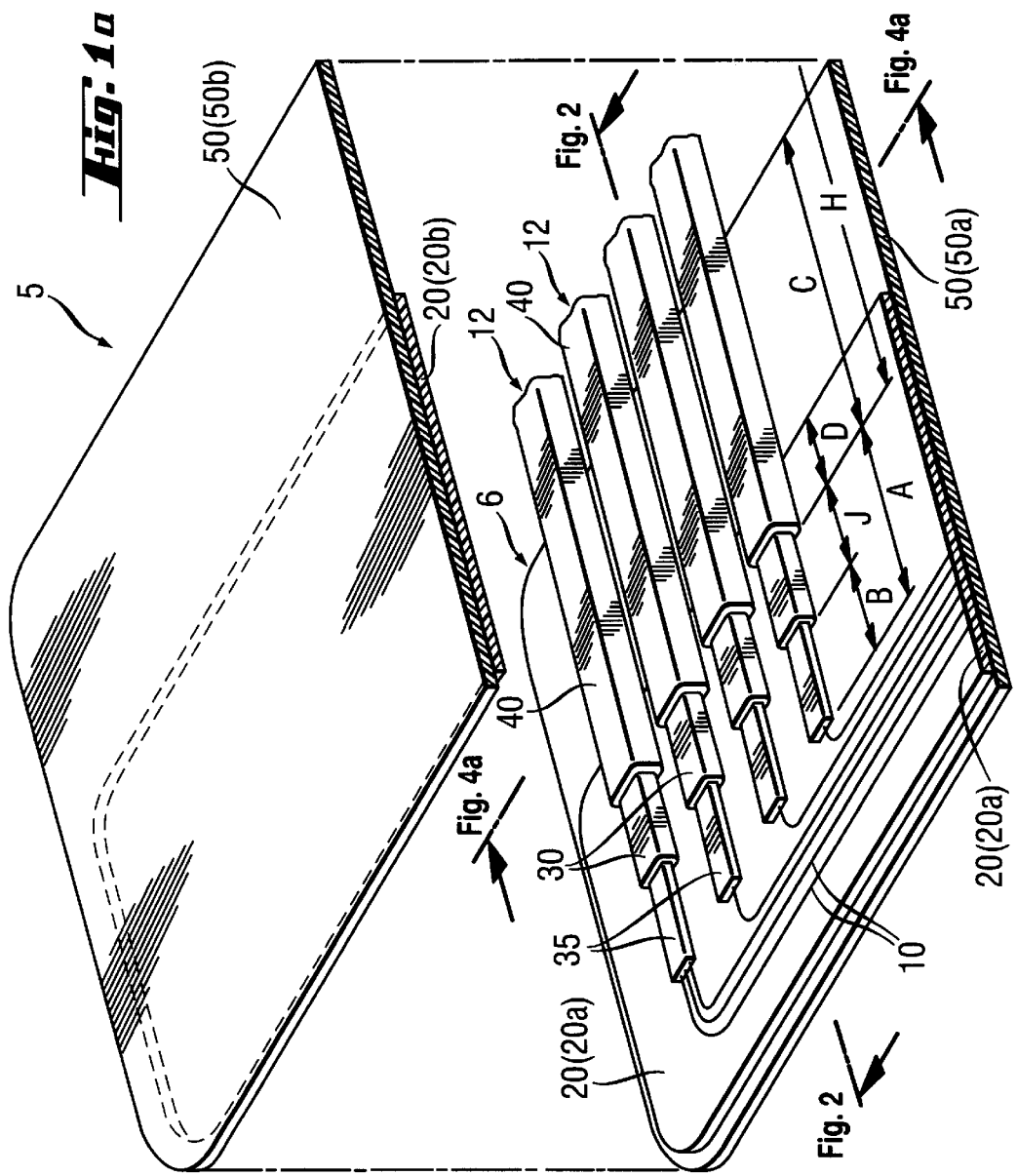

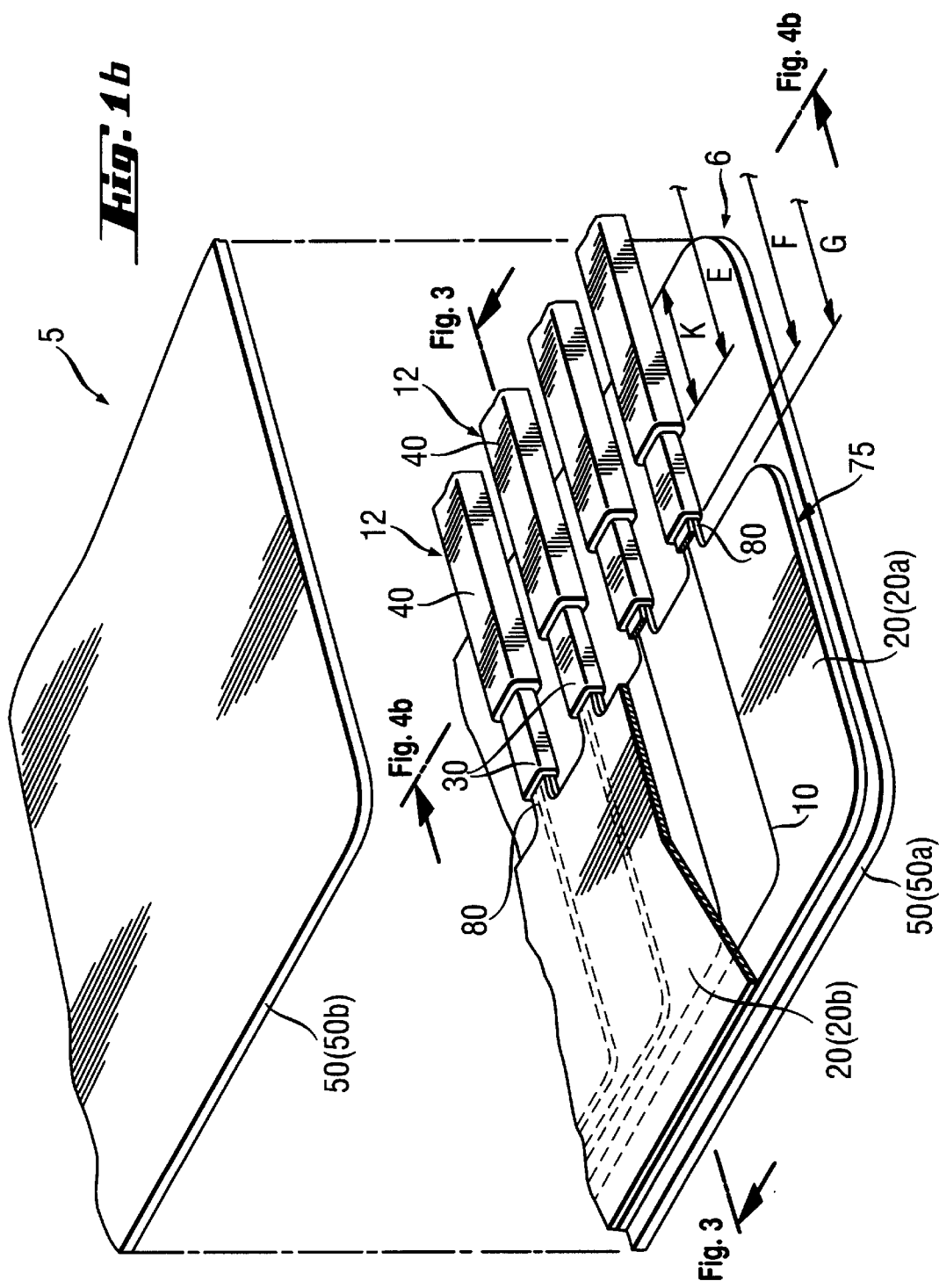

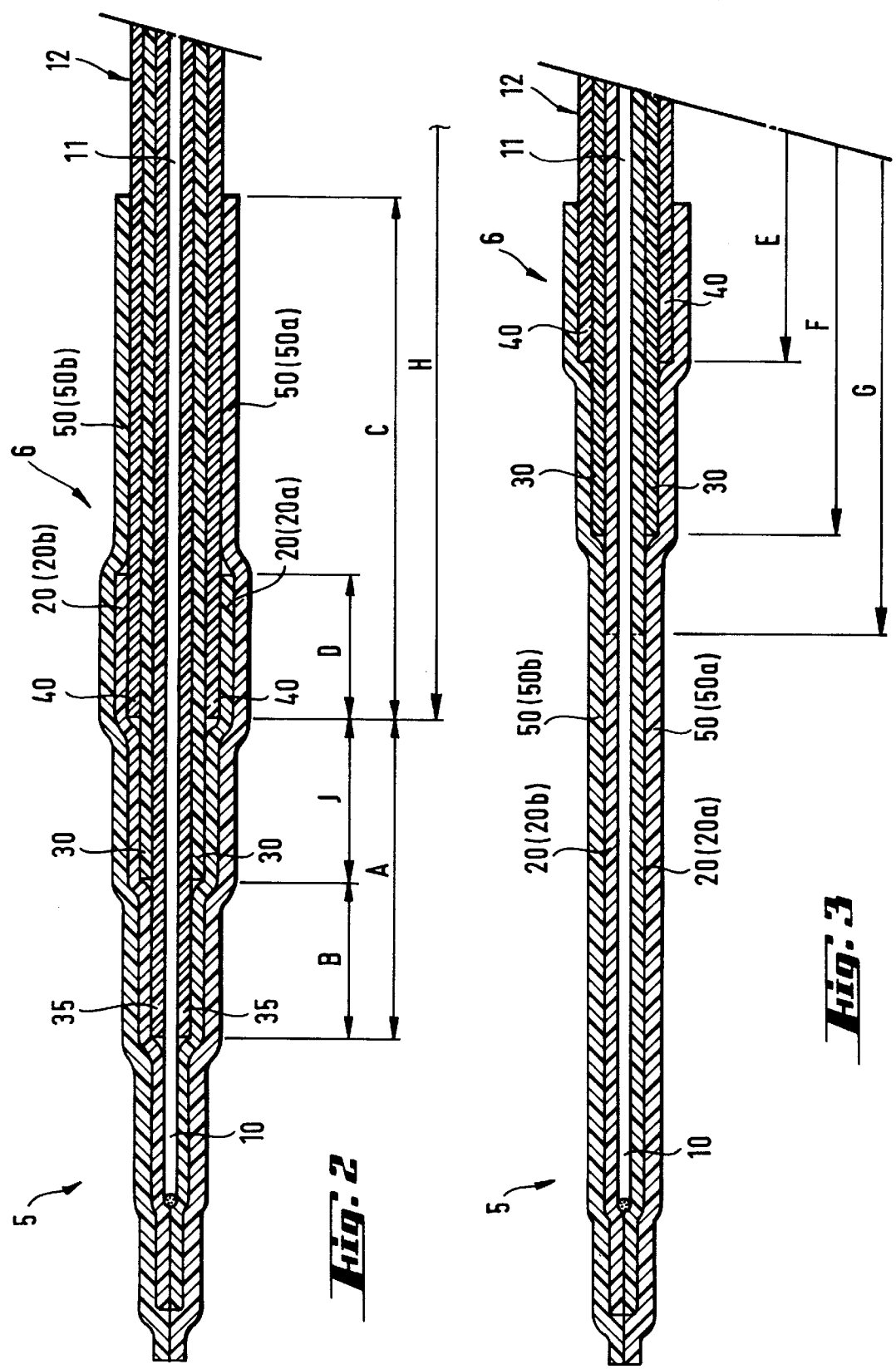

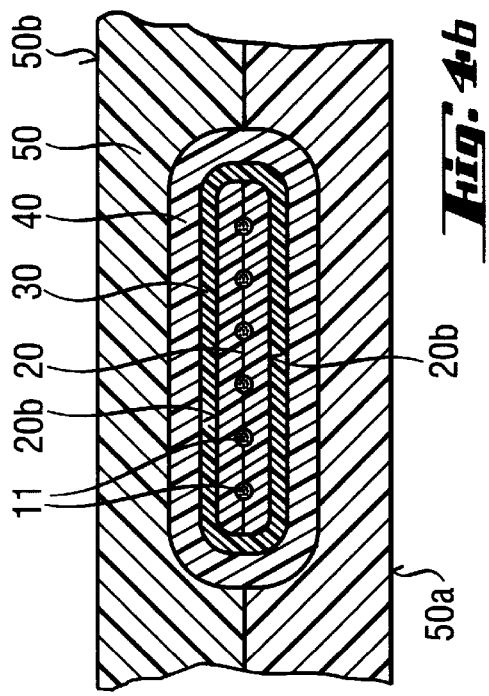
Fig. 4:b
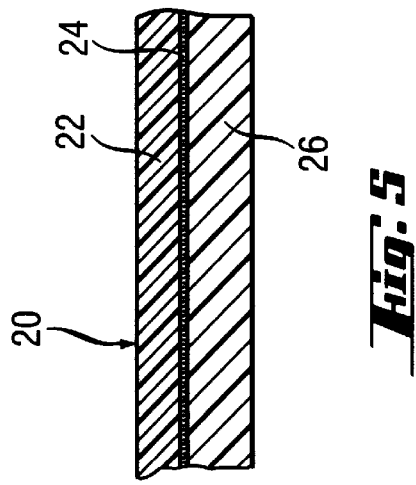
Fig. 5
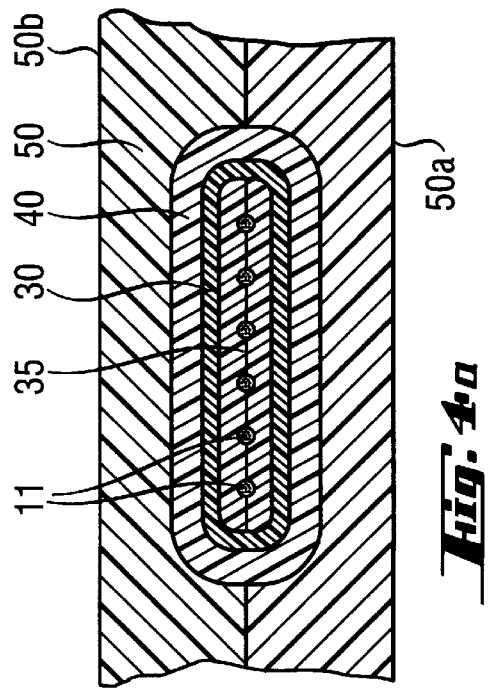
Fig. 4:a
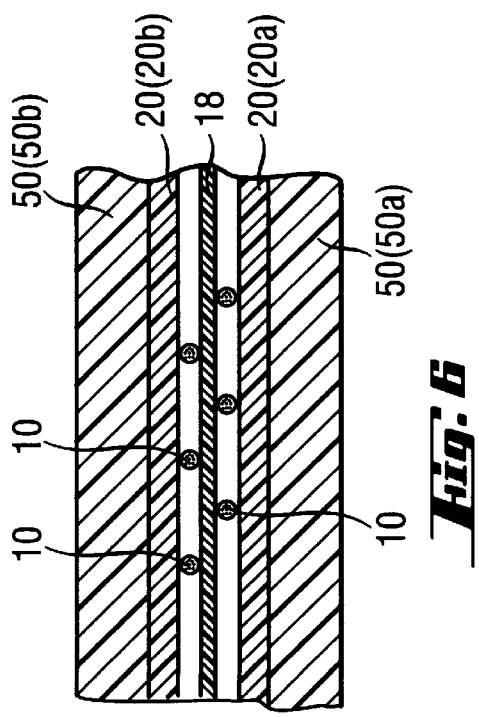
Fig. 6

FIBRE OPTIC ROUTING SYSTEM

FIELD OF THE INVENTION

The invention relates to a fibre optic routing system for routing a plurality of fibre optic cables.

PRIOR ART

Routing boards are known, for example, from U.S. Pat. No. 5,204,925 (Bonanni et al.), assigned to AT&T Bell Laboratories, Murray Hill, N.J. It is known that optical fibres incorporated into such routing boards are very fragile and can be broken easily when put under stress. One weak link in such routing boards is the connection at the edge of the routing boards where the optical fibres are connected to the outside world. The connecting element is often placed under both lateral and transverse stresses and thus may be easily damaged.

From pending U.S. Ser. No. 08/880,965 filed Jun. 23, 1997 (Schricker) a laminate for use in opto-electronic devices is known which is compressible and also resistant to mechanical stresses. The use of the taught laminate for a routing board connecting element is, however, not disclosed in this patent.

Connectors for attachment to optical fibres are known from U.S. Pat. No. 4,678,264 (Bowen et al.) assigned to AMP Inc. and from U.S. Pat. No. 4,998,796 (Bonanni et al.) assigned to AT&T Bell Laboratories. Neither of these document disclose, however, a connection to a routing board.

SUMMARY OF THE INVENTION

The object of the invention is therefore to improve the mechanical connection between a fibre optic routing board and a fibre optic cable.

A further object of the invention is to protect the optical fibres in the routing board from mechanical stress.

These and other objects of the invention are achieved by providing a fibre optic routing system with one or more optical conductors disposed between a first lower laminate layer and a first upper laminate layer, the one or more optical conductors being connected to at least one of the optical fibres in the plurality of fibre optic cables, wherein at least one of the first lower laminate layer or the first upper laminate layer is so constructed that it attaches at least one of a jacket over a first. By means of this construction, a mechanically strong bond is achieved between the laminate of the fibre optic routing board and the jacket of the fibre optic cable which reduces the risk that the fibre optic cable becomes separated from the fibre optic routing board when transverse or longitudinal stresses are applied to the fibre optic cable or the routing board. For the strongest joint, the jacket is preferably attached to both the first lower laminate layer and the first upper laminate layer.

Advantageously, the fibre optic routing board additionally comprises a second laminate layer positioned between the first upper or lower laminate layer and the optical conductors. The use of a two layer laminate allows each of the laminate layers to have different properties. Thus one layer might reduce transverse stresses on the connecting element and enclosed optical fibre whilst another layer might reduce longitudinal stresses on the connecting element and enclosed optical fibre.

In one embodiment of the invention, the jacket is attached to said second laminate layer over a second distance, thus additionally providing a mechanically strong bond between the fibre optic cable and the second laminate layer.

In another embodiment of the invention, an extension extends from the edge of said second laminate layer to a third distance within said jacket tube. This construction allows the second lamiante to be used to buffer the optical fibres within the fibre optic cable. It substantially improves the strength of the connection between the fibre optic cable and the fibre optic routing board since part of the routing board becomes part of the fibre optic cable.

The fibre optic cable has preferably reinforcement which is attached to said first upper laminate layer and/or said first lower laminate layer over a fifth distance and said second laminate layer over a sixth distance. This further improves the mechanical strength of the connection between the routing board and the fibre optic cable.

Preferably the fibre optic cable includes a buffering layer positioned between the reinforcement tube and the at least one of said optical conductors for buffering the optical conductors within the fibre optic cable.

In a preferred embodiment of the invention the first upper laminate layer and/or the first lower laminate layer and/or the second laminate layer comprise at least a first compressible layer and/or a mechanically resistant layer. The compressible layer is used to to improve the crush resistance of the routing board whilst the mechanically resistant layer improves the tolerance of the routing board to tensile forces. Preferably the compressible layer is made from expanded polytetrafluoroethylene (PTFE), foamed polyurethane, silicones and foamed polyethylene and the mechanically resistant layer is made from expanded PTFE, polyester, polyamide, or polyimide.

In a further embodiment of the invention a compressible layer is provided between the one or more optical conductors in order to protect the optical fibre conductors.

In one aspect, the routing system is a fibre optic routing system for routing a plurality of fibre optic cables comprising:

a plurality of fibre optic cable, each having at least one optical fibre surrounded by ajacket; and a routing board with a first lower laminate layer situated below a first upper laminate layer, one or more optical conductors disposed between said first lower laminate layer and said first upper laminate layer, the one or more optical conductors being connected to at least one of the optical fibres in one of the plurality of fibre optic cables, wherein at least one of said first lower laminate layer or said first upper laminate layer is so constructed that it attaches at least one of the jacket over a first distance surrounding at least one of said optical fibres.

DETAILED DESCRIPTION OF THE DRAWINGS

FIGS. 1a & 1b show perspective views of a fibre optic routing board according to the invention.

FIG. 2 shows a ruggedised connecting element between a fibre optic ribbon cable and a fibre optic routing board according to one embodiment of the invention.

FIG. 3 shows a ruggedised connecting element between a fibre optic ribbon cable and a fibre optic routing board according to a second embodiment of the invention.

FIGS. 4a & 4b show a cross-sectional view through 4a—4a and 4b—4b of the fibre optic routing board of FIG. 1a and 1b respectively.

FIG. 5 shows a laminate which may be used as a laminate layer in the fibre optic routing board of the invention.

FIG. 6 shows a compressible layer positioned between the optical conductors on the routing board.

DETAILED DESCRIPTION OF THE INVENTION

FIGS. 1a, 1b, 4a and 4b show a routing board 5 having a plurality of incoming fibre optic cables 12. Each fibre optic cable 12 has at least one optical fibre 11 positioned within it. The plurality of fibre optic conductors 10 are embedded within a first laminate layer 20 and a second laminate layer 50. The routing board 5 is used for routing fibre optic conductors 10 between the optical fibres 11 in the fibre optic cables 12 and/or circuit packs (not shown) containing semiconductor components (not shown) and is described, for example, in U.S. Pat. No. 5,204,925 (Bonanni et al.), assigned to AT&T Bell Laboratories, Murray Hill, N.J.

The first laminate layer 20 is preferably made from two polymer layers 22 and 26 laminated together as is shown in FIG. 5. A first one 22 of the two polymer layers is preferably a compressible polymer layer such as an expanded fluoroploymer. The first polymer layer 22 serves to buffer the fibre optic conductors 10 from damage caused by external forces on the surface of the routing board 5. Most preferably the first polymer layer 22 is made from expanded polytetrafluoroethylene (ePTFE). In the preferred embodiment of the invention, the ePTFE has a density between 0.6 g/cm$^3$ and 1.8 g/cm$^3$ and thus a porosity between 18% and 73%. The expanded PTFE used is preferably that disclosed and described in U.S. Pat. No. 3,953,566, U.S. Pat. No. 3,962,153, U.S. Pat. No. 4,096,227 and U.S. Pat. No. 4,187,390.

The second one 26 of the two polymer layers is preferably a polymer which is chosen to provide the routing board 5 with high mechanical strength to resist damage to the enclosed fibre optic conductors 10 due to mechanical stress on the routing board 5. Such mechanical stress may be caused by longitudinal forces exerted on the laminate by external influences. In order to provide sufficient mechanical strength, the second laminate layer 50 needs to have a high tensile strength. A tensile strength of 8000–15000 psi, preferably 12000 psi, is sufficient to provide adequate mechanical protection. A suitable polymer for use has been found to be polyester. However, other polymers, such as expanded PTFE, polyamide and polyimide, having the required properties can be also used.

The first polymer layer 22 and the second polymer layer 26 are laminated together by coating the first polymer layer 22 with a thermoplastic adhesive 24 and applying pressure and heat to the laminate. Suitable thermoplastic adhesives 24 can be selected from the group of adhesives containing polyester-based adhesives, polyurethane adhesives, fluorinated ethylene-propylene copolymers (FEP) adhesives, and perfluoroalkyl ethers of PTFE polymers. The temperature and pressure which have to be applied depend on the composition of the thermoplastic adhesives.

Alternatively, a pressure sensitive adhesive tape 24 could be used to laminate the first polymer layer 22 to the second polymer layer 26. Examples of such tapes are manufactured by the 3M Corp. of St. Paul, Minn., and are made from a modified acrylic adhesive. They are sold under the brand name SCOTCH™. Alternatively silicone or rubber based adhesives may be used. In this method, a pressure-sensitive adhesive tape 24 is placed on one side of the first polymer layer 22. On the pressure-sensitive adhesive tape 24, the second polymer layer 26 is placed. Pressure is then applied to the surface of the second polymer layer 26 and the first polymer layer 22 and the first laminate layer 20 then become laminated together.

The manufacture of the first laminate layer 20 for the routing board 5 is described in more detail in co-pending U.S. Ser. No. 08/880,968 to the inventor herein, filed Jun. 23, 1997, incorporated by reference.

The second laminate layer 50 can either be constructed from two polymer layers as described above and depicted in FIG. 5 or it may merely consist of a single polymer layer which imparts high mechanical strength to the routing board 5. In this case a polymer such as polyester would be chosen. As shown in FIG. 1, the area of the second laminate layer 50 is preferably greater than that of the first laminate layer 20 so as to protect the first laminate layer 20 from mechanical damage.

The connection of the fibre optic ribbon cables 12 to the routing board 5 will now be described.

A first embodiment of the invention is depicted in FIG. 1a and FIG. 4a. It is shown in a longitudinal sectional view in FIG. 2. In this embodiment of the invention, the optical conductors 10 from the conventional fibre optic cable 12 such as the FLEX-LITE™ fibre optic ribbon cable supplied by W. L. Gore & Associates are to be connected to the routing board 5. The fibre optic cable 12 includes a buffering layer 35 placed in immediate contact with the plurality of optical conductors 10 within the fibre optic cable 12 and a reinforcement layer 30 placed between the buffering layer 35 and an outer jacket 40. The reinforcement 30 is used to provide mechanical strength for the fibre optic cable 12 and can be made of any material with high tensile strength. In the preferred embodiment of the invention, it is preferably made of aramide fibres, for example KEVLAR® braid or fibre. Alternatively it could be made from thin glass fibres, polymer coated thin glass fibres, RASTEX® fibres made from ePTFE and obtainable from by W. L. Gore & Associates or DYNAR® fibres. The buffering layer 35 buffers the optical conductors 10 from the outside environment and is preferably made from expanded PTFE.

The outer jacket 40 serves to protect the reinforcing tube 30 from damage. The outer jacket can be made of any material suitable for such purpose such as polyvinylchloride (PVC), expanded PTFE such as GORE-TEX® laminate available from W. L. Gore & Associates, PTFE, fluorinated ethylene/propylene(FEP), a co-polymer of TFE and perfluoropropylvinyletlier(PFA), PVDF, polyester, polyurethane or polyamide.

Referring to FIGS. 1a and 2, to connect the fibre optic cable 12 to the routing board 5, part of the outer jacket 40 is removed over at least a distance A to expose the reinforcement 30 over a distance J and part of the reinforcement 30 is also removed to expose the buffering layer 35 over a distance B. Naked, i.e. unprotected, optical fibres 11 protrude out of the end of the fibre optic cable 12. The outer jacket 40 remains attached to the fibre optic cable 12 over a distance H. The fibre optic cable 12 is then laid on the bottom half of a routing board 5 which comprises the bottom second laminate layer 50a and the bottom first laminate layer 20a such that the outer jacket 40 extends at distance C over the bottom second laminate layer 50a and a distance D over the bottom first laminate layer 20a as is shown on FIG. 1a. After placement of the fibre optic cable 12 on the routing board 5, the fibre optic conductors 10 extending therefrom are routed to the required positions on the routing board 5. These position may be to other fibre optic cables 12 or to opto-electronic components (not shown). Preferably the upper side of the bottom first laminate layer 20a is provided with fixation means in order to secure the fibre optic cable 12 and the fibre optic conductors 10 protruding therefrom during the manufacturing process.

The fixation means used may be a pressure sensitive adhesive or other adhesives such as those listed above for laminating the polymer layers 22 and 24 in the first laminate layer 20 or the second laminate layer 50.

After all of the required fibre optic cables 12 are connected to and placed on the routing board 5 and the fibre optic conductors 10 are placed in their required positions, the top first laminate layer 20b is placed over the fibre optic cables 12 and fibre optic conductors 10 directly above the bottom first laminate layer 20a. The bottom side of the top first laminate layer 20b is coated with an adhesive, similar to those listed above which bonds with the top side of the bottom first laminate layer 20a and with the outer jacket 40, the reinforcement 30, and the buffering layer 35 of the fibre optic cable 12. The top second laminate layer 50b is then placed over the top first laminate layer 20b such that it is directly above the bottom second laminate layer 50a. The bottom side of the top second laminate layer 50b is coated with an adhesive such that it adheres to the top side of the top first laminate layer 20b, the top side of the bottom laminate layer 50a and the outerjacket 40 of the fibre optic cable 12.

After any required curing treatment for the adhesives is carried out, an extremely strong connection is made between the fibre optic cable 12, the fibre optic conductors 10 and the routing board 5 such that the routing board 5 and attached fibre optic cables 12 can withstand high tensile forces.

A second embodiment of the invention is shown in FIG. 1b and FIG. 4b. It is shown as a longitudinal section in FIG. 3. In this embodiment of the invention, conventional fibre optic ribbon cable is not used as the fibre optic cable 12. Instead the fibre optic cable 12 is formed by an extension 80 from a main portion 75 of the first laminate layer 20 as a protrusion or finger from the edge 6 of the routing board 5. This can be clearly seen in FIG. 3 by comparison with FIG. 2.

In FIG. 3 it is shown that part of the first laminate layer 20 extends beyond a main body 75 of the first laminate layer 20 and beyond the edge of the routing board 5. The extension 80 includes the fibre optic conductors 10 sandwiched by the first laminmate layer 20. A reinforcement 30 is placed over the first laminate layer 20 over a distance F. The reinforcement 30 is disposed between an outer jacket 40 and the first laminate layer 20 over a distance E. In this embodiment of the invention, the extension 80 of the first laminate layer 20 within the fibre optic cable 12 buffers the fibre optic conductors 10 and there is thus no need for a separate buffering layer 35 as known from the first embodiment of the invention (FIG. 2). The outer jacket 40 and the reinforcement 30 according to this embodiment of the invention can be made from the same materials as those used in constructing the first embodiment of this invention.

Manufacture of the second embodiment of the invention is carried out as follows. In a first step, a first bottom and top first laminate layer 20a, 20b are cut to the required dimensions for the main body 75 of the routing board 5 and the extension 80. The reinforcement is attached respectively to the bottom side of the extension 80 of the bottom first laminate layer 20a and the top side of the extension 80 of the top first laminate layer 20b. In particular it should be noted that both the bottom first laminate layer 20a and the top first laminate layer 20b must be matched in form with extensions 80 of similar length. The main body 75 bottom first laminate layer 20a is placed on the bottom second laminate layer 50 such that the bottom second laminate layer 50a completely covers the main body 75 of the bottom first laminate layer 20a with only the extensions 80 extending beyond the edge 6 of the bottom second laminate layer 20a.

The fibre optic conductors 10 are laid on the surface of the bottom first laminate layer 20a in the required routing configuration. The top first laminate layer 20b is then placed on the fibre optic conductors 10 exactly over the planar area of the bottom first laminate layer 20a such that the fibre optic conductors 10 are enclosed by the top first laminate layer 20b and the bottom first laminate layer 20a.

The reinforcement 30 and the outer jacket 40 are then placed over the extensions 80. Finally the top and bottom second laminate layers 50a and 50b are put in position over each other as described above. Fixation means such as adhesives are used to ensure bonding between the various components of the routing board 5 and the fibre optic cables 12. After curing of the adhesives, an extremely strong bond is formed between the extensions 80 and the routing board 5 which protects the fibre optic conductors 10 from damage.

In the above description, it has been assumed that the fibre optic cables 12 are ribbon cables. However, round fibre optic cables could also be used.

In an additional embodiment of the invention as shown in FIG. 6, a compressible layer 18 is placed between the optical conductors 10 within the routing board 5. This compressible layer 18 is made from the same materials as the polymer layer 22 and most preferably from expanded PTFE. This compressible layer serves to protect the optical conductors 10 from damaging each other and additionally serves to minimise any damage to the optical conductors 10 from mechanical damage from external influences. It is furthermore possible to use several compressible layers 18 between the optical conductors 10.

Although a few exemplary embodiments of the present invention have been described in detail above, those skilled in the art readily appreciate that many modifications arc possible without materially departing from the novel teachings and advantages which are described herein. Accordingly, all such modifications are intended to be included within the scope of the present invention, as defined by the following claims.

I claim:

1. Fiber optic routing system for routing a plurality of fiber optic cables comprising:
   a plurality of fiber optic cables, each having at least one optical fiber surrounded by a jacket; and
   a routing board with
     a first lower laminate layer situated below a first upper laminate layer, one or more optical conductors disposed between said first lower laminate layer and said first upper laminate layer, the one or more optical conductors being connected to at least one of the optical fibers in one of the plurality of fiber optic cables, wherein
       at least one of said first lower laminate layer or said first upper laminate layer is so constructed that it is attached to the jacket over a first distance surrounding at least one of said optical fibers, the at least one of the first upper laminate layer or the first lower laminate layer comprising at least a first compressible layer of polytetrafluorethylene attached to a first mechanically resistant layer.

2. Fiber optic routing system according to claim 1 wherein the first mechanically resistant layer is made from the group of materials selected from expanded PTFE, polyester, polyamide or polyimide.

3. Fiber optic routing system according to claim 1 wherein the first mechanically resistant layer is made from polyester.

4. Fiber optic routing system according to claim 1 wherein said first lower laminate layer and said first upper laminate layer are both attached to the said jacket over said first distance.

5. Fiber optic routing system according to claim 1 wherein a second laminate layer is positioned over at least a second distance between the at least one of said optical fibers and said first upper laminate layer or said first lower laminate layer.

6. Fiber optic routing system according to claim 5 wherein the jacket is attached to said second laminate layer over at least a second distance.

7. Fiber optic routing system according to claim 5 wherein an extension extends from the edge of said second laminate layer to a third distance within the jacket.

8. Fiber optic routing system according to claim 1 wherein the jacket surrounds a reinforcement over at least a part of a fourth distance of the reinforcement.

9. Fiber optic routing system according to claim 8 wherein the reinforcement is attached to said second upper laminate layer and/or said first lower laminate layer over a fifth distance.

10. Fiber optic routing system according to claim 8 wherein the reinforcement is attached to said second upper laminate layer over a sixth distance.

11. Fiber optic routing system according to claim 1 wherein positioned between the reinforcement and the at least one of said optical fibers.

12. Fiber optic routing system according to claim 5 wherein the second laminate layer comprises a second compressible layer attached to a second mechanically resistant layer.

13. Fiber optic routing system according to claim 12 wherein said second compressible layer is made from the group of materials selected from expanded polytetrafluoroethylene (PTFE), foamed polyurethane, foamed polyester, polyethylene foams and silicones.

14. Fiber optic routing system according to claim 12 wherein said second compressible layer is made from expanded PTFE.

15. Fiber optic routing system according to 12 wherein the second mechanically resistant layer is made from the group of materials selected from expanded PTFE, polyester, polyamide or polyimide.

16. Fiber optic routing system according to claim 12 wherein the second mechanically resistant layer is made from polyester.

17. Fiber optic routing system according to claim 1 wherein at least a third compressible layer is provided between at least two of the optical conductors.

18. Fiber optic routing system according to claim 17 wherein said third compressible layer is made from the group of materials selected from expanded polytetrafluoroethylene (PTFE), foamed polyurethane, foamed polyester, polyethylene foams and silicones.

19. Fiber optic routing system according to claim 17 wherein said third compressible layer is made from expanded PTFE.

20. Fiber optic routing system according to claim 1 wherein at least one of the plurality of fiber optic cables has at least two optical fibers.

21. Fiber optic routing system for routing a plurality of fiber optic cables comprising:
a plurality of fiber optic cable, each having at least one optical fiber surrounded by a jacket; and
a routing board with
a first lower laminate layer situated below a first upper laminate layer, one or more optical conductors disposed between said first lower laminate layer and said first upper laminate layer, the one or more optical conductors being connected to at least one of the optical fibers in one of the plurality of fiber optic cables, wherein
at least one of said first lower laminate layer of said first upper laminate layer is so constructed that it is attached to the jacket over a first distance surrounding at least one of said optical fibers, and a second laminate layer is positioned over at least a second distance between the at least one of said optical fibers and said first upper laminate layer or said first lower laminate layer, the second laminate layer comprising a second compressible layer made from expanded polytetrafluorethylene attached to a second mechanically resistant layer.

22. Fiber optic routing system according to claim 21 wherein said first lower laminate layer and said first upper laminate layer are both attached to the said jacket over said first distance.

23. Fiber optic routing system according to 21 wherein the jacket is attached to said second laminate layer over at least a second distance.

24. Fiber optic routing system according to claim 21 wherein an extension extends from the edge of said second laminate layer to a third distance within the jacket.

25. Fiber optic routing system according to claim 21 wherein the jacket surrounds a reinforcement over at least a part of a fourth distance of the reinforcement.

26. Fiber optic routing system according to claim 25 wherein the reinforcement is attached to said first upper laminate layer and/or said first lower laminate layer over a fifth distance.

27. Fiber optic routing system according to claim 25 wherein the reinforcement is attached to said second layer upper laminate layer over a sixth distance.

28. Fiber optic routing system according to claim 21 wherein a buffering layer is positioned between the reinforcement and the at least one of said optical fibers.

29. Fiber optic routing system according to claim 21 wherein at least one of the first upper laminate layer or the first lower laminate layer comprise at least a first compressible layer attached to a first mechanically resistant layer.

30. Fiber optic routing system according to claim 29 wherein said first compressible layer is made from the group of materials selected from expanded polytetrafluorethylene (PTFE), foamed polyurethane, foamed polyester, polyethylene foams and silicones.

31. Fiber optic routing system according to claim 29 wherein
said first compressible layer is expanded PTFE.

32. Fiber optic routing system according to claim 29 wherein
the first mechanically resistant layer is made from the group of materials selected from expanded PTFE, polyester, polyamide or polyimide.

33. Fiber optic routing system according to claim 29 wherein
the first mechanically resistant layer is made from polyester.

34. Fiber optic routing system according to claim 21 wherein
the second mechanically resistant layer is made from the group of materials selected from expanded PTFE, polyester, polyamide or polyimide.

35. Fiber optic routing system according to claim 21 wherein
the second mechanically resistant layer is made from polyester.

36. Fiber optic routing system according to claim 21 wherein
at least a third compressible layer is provided between at least two of the optical conductors.

37. Fiber optic routing system according to claim 36 wherein
said third compressible layer is made form the group of materials selected from expanded polytetrafluorethylene (PTFE), foamed polyurethane, foamed polyester, polyethylene foams and silicones.

38. Fiber optic routing system according to claim 36 wherein
said third compressible layer is made from expanded PTFE.

39. Fiber optic routing system according to claim 21 wherein
at least one of the plurality of fiber optic cables has at least two optical fibers.

* * * * *